United States Patent
Matoba et al.

(10) Patent No.: US 6,960,547 B2
(45) Date of Patent: Nov. 1, 2005

(54) DIELECTRIC CERAMIC COMPOSITION AND CAPACITOR USING THE SAME

(75) Inventors: Hiroaki Matoba, Moriyama (JP); Atsushi Sano, Shiga-ken (JP); Hiroshi Tamura, Otsu (JP)

(73) Assignee: Murata Manufacturing Co., Ltd (JP)

( * ) Notice: Subject to any disclaimer, the term of this patent is extended or adjusted under 35 U.S.C. 154(b) by 334 days.

(21) Appl. No.: 10/255,614

(22) Filed: Sep. 27, 2002

(65) Prior Publication Data

US 2003/0057405 A1 Mar. 27, 2003

(30) Foreign Application Priority Data

Sep. 27, 2001 (JP) .......................................... 2001-297967

(51) Int. Cl.⁷ ........................ C04B 35/465; H01G 4/10; H01G 4/12
(52) U.S. Cl. ..................................... 501/139; 361/321.5
(58) Field of Search ................................ 501/134, 135, 501/136, 138, 139; 361/321.1, 321.2, 321.5

(56) References Cited

U.S. PATENT DOCUMENTS

| | | |
|---|---|---|
| 5,889,647 A | 3/1999 | Hansen et al. |
| 6,072,688 A | 6/2000 | Hennings et al. |
| 6,385,035 B1 * | 5/2002 | Matoba et al. ........... 361/321.1 |

FOREIGN PATENT DOCUMENTS

| | | |
|---|---|---|
| EP | 1 070 685 | 1/2001 |
| GB | 2 208 644 | 4/1989 |
| JP | 10-139538 | 5/1988 |
| JP | 320 1503 | 9/1991 |
| JP | 07-267732 | 10/1995 |
| WO | WO 96/06811 | 3/1996 |

* cited by examiner

*Primary Examiner*—Mark Kopec
(74) *Attorney, Agent, or Firm*—Dickstein, Shapiro, Morin & Oshinsky, LLP.

(57) ABSTRACT

A dielectric ceramic composition having a high maximum relative dielectric constant, a superior temperature characteristic of capacitance and a high AC breakdown voltage, and a capacitor using the same are provided. The dielectric ceramic composition includes a polycrystalline solid solution which contains barium titanate as a primary component and which is represented by the formula $(Ba_{1-x}Ca_x)_a(Ti_{1-y}Zr_y)_bO_3$ in which $0<x\leq0.25$ and $0<y\leq0.25$ are satisfied. The dielectric ceramic composition also includes, with respect to 100 parts by weight of the primary component, a Y component in the form of $Y_2O_3$ in an amount in the range of more than zero to about 5 parts by weight; a Mg component in the form of MgO in an amount in the range of more than zero to about 2 parts by weight, and an Al component in the form of $Al_2O_3$ in an amount in the range of more than zero to about 2.5 parts by weight.

19 Claims, No Drawings

DIELECTRIC CERAMIC COMPOSITION AND CAPACITOR USING THE SAME

BACKGROUND OF THE INVENTION

1. Field of the Invention

The present invention relates to dielectric ceramic compositions having a high relative dielectric constant, a flat temperature characteristic of capacitance and a high AC breakdown voltage, and to capacitors using the same.

2. Description of the Related Art

As ceramic materials which have a high dielectric constant and have been widely used for single plate capacitors, multilayer ceramic capacitors, high-frequency ceramic capacitors, high-voltage ceramic capacitors and the like, a material primarily composed of a $BaO$—$CaO$—$TiO_2$—$ZrO_2$-based dielectric ceramic composition has been generally used in practice.

However, the conventional $BaO$—$CaO$—$TiO_2$—$ZrO_2$-based dielectric ceramic composition has problems in that a temperature characteristic of capacitance is degraded with an increase in relative dielectric constant and in addition, the AC breakdown voltage is also decreased.

As a dielectric ceramic composition which solves these problems, a material has been disclosed in Japanese Unexamined Patent Application Publication No. 7-267732; however, the only disclosed AC breakdown voltage is a maximum of 4.5 kV/mm.

SUMMARY OF THE INVENTION

Accordingly, an object of the present invention is to provide a dielectric ceramic composition having a high maximum relative dielectric constant, a superior temperature characteristic of capacitance and a high AC breakdown voltage, and to provide a capacitor using the same.

A dielectric ceramic composition of the present invention comprises a polycrystalline solid solution which contains barium titanate as a primary component and which is represented by the formula $(Ba_{1-x}Ca_x)_a(Ti_{1-y}Zr_y)_bO_3$ in which $0<x<0.25$ and $0 \leq y \leq 0.25$ are satisfied. In addition, with respect to 100 parts by weight of the primary component, the dielectric ceramic composition described above further comprises a Y component in the form of $Y_2O_3$ in an amount in the range of more than zero to about 5 parts by weight; a Mg component in the form of MgO in an amount in the range of more than zero to about 2 parts by weight, and an Al component in the form of $Al_2O_3$ in an amount in the range of more than zero to about 2.5 parts by weight.

In the polycrystalline solid solution containing barium titanate as the primary component represented by the formula $(Ba_{1-x}Ca_x)_a(Ti_{1-y}Zr_y)bO_3$, 0.965 a/b 1.03 is preferably satisfied.

The dielectric ceramic composition described above may further comprise a Mn component in the form of MnO as an accessory component in an amount of about 2 parts by weight or less with respect to 100 parts by weight of the primary component.

The dielectric ceramic composition described above may further comprise a Si component in the form of $SiO_2$ as an accessory component in an amount of about 2 parts by weight or less with respect to 100 parts by weight of the primary component.

In addition, the dielectric ceramic composition described above may further comprise a Nb component in the form of $Nb_2O_5$ as an accessory component in an amount of about 1 part by weight or less with respect to 100 parts by weight of the primary component.

Furthermore, a capacitor according to the present invention comprises a dielectric ceramic sheet formed of the dielectric ceramic composition described above and electrodes provided on two surfaces of the dielectric ceramic sheet.

DESCRIPTION OF THE PREFERRED EMBODIMENTS

Hereinafter, an embodiment of the present invention will be described with reference to an example.

EXAMPLE

As starting materials, barium carbonate ($BaCO_3$), calcium carbonate ($CaCO_3$), titanium oxide ($TiO_2$), zirconium oxide ($ZrO_2$), yttrium oxide ($Y_2O_3$), magnesium oxide (MgO), aluminum oxide ($Al_2O_3$), manganese oxide (MnO), silicon oxide ($SiO_2$) and niobium oxide ($Nb_2O_5$) were prepared, and after these starting materials were weighed and wet-mixed by a ball mill so as to obtain final compositions shown in Tables 1 and 2, drying thereof was performed by evaporation.

TABLE 1

| Sample # | Primary Component | | | | | Accessory Component PBW* | | | | | |
|---|---|---|---|---|---|---|---|---|---|---|---|
| | a/b | Ba (1-x) | Ca (x) | Ti (1-y) | Zr (y) | $Y_2O_3$ | MgO | $Al_2O_3$ | MnO | $SiO_2$) | $Nb_2O_5$ |
| 1 | 1.003 | 0.950 | 0.050 | 0.860 | 0.140 | 1.0 | 0.2 | 0.2 | 0 | 0 | 0 |
| 2 | 1.003 | 0.930 | 0.070 | 0.920 | 0.080 | 1.0 | 0.2 | 0.2 | 0 | 0 | 0 |
| 3 | 1.003 | 0.880 | 0.120 | 0.880 | 0.120 | 1.0 | 0.2 | 0.2 | 0 | 0 | 0 |
| 4 | 1.003 | 0.860 | 0.140 | 0.820 | 0.180 | 1.0 | 0.2 | 0.2 | 0 | 0 | 0 |
| 5 | 1.003 | 0.830 | 0.170 | 0.960 | 0.040 | 1.0 | 0.2 | 0.2 | 0 | 0 | 0 |
| 6 | 1.003 | 0.890 | 0.110 | 0.750 | 0.250 | 1.0 | 0.2 | 0.2 | 0 | 0 | 0 |
| 7 | 1.003 | 0.750 | 0.250 | 0.880 | 0.120 | 1.0 | 0.2 | 0.2 | 0 | 0 | 0 |
| *8 | 1.003 | 0.960 | 0.040 | 0.700 | 0.300 | 1.0 | 0.2 | 0.2 | 0 | 0 | 0 |
| *9 | 1.003 | 0.860 | 0.140 | 0.700 | 0.300 | 1.0 | 0.2 | 0.2 | 0 | 0 | 0 |
| *10 | 1.003 | 0.700 | 0.300 | 0.840 | 0.160 | 1.0 | 0.2 | 0.2 | 0 | 0 | 0 |
| *11 | 1.003 | 0.700 | 0.300 | 0.930 | 0.070 | 1.0 | 0.2 | 0.2 | 0 | 0 | 0 |
| *12 | 1.001 | 0.930 | 0.070 | 0.920 | 0.080 | 0 | 0.4 | 0.3 | 0 | 0 | 0 |
| 13 | 1.001 | 0.930 | 0.070 | 0.920 | 0.080 | 0.1 | 0.4 | 0.3 | 0 | 0 | 0 |
| 14 | 1.001 | 0.930 | 0.070 | 0.920 | 0.080 | 2.0 | 0.4 | 0.3 | 0 | 0 | 0 |

TABLE 1-continued

| | | | | | | | | | | | |
|---|---|---|---|---|---|---|---|---|---|---|---|
| 15 | 1.001 | 0.930 | 0.070 | 0.920 | 0.080 | 5.0 | 0.4 | 0.3 | 0 | 0 | 0 |
| *16 | 1.001 | 0.930 | 0.070 | 0.920 | 0.080 | 6.0 | 0.4 | 0.3 | 0 | 0 | 0 |
| *17 | 0.999 | 0.950 | 0.050 | 0.860 | 0.140 | 0.4 | 0 | 0.3 | 0 | 0 | 0 |
| 18 | 0.999 | 0.950 | 0.050 | 0.860 | 0.140 | 0.4 | 0.1 | 0.3 | 0 | 0 | 0 |
| 19 | 0.999 | 0.950 | 0.050 | 0.860 | 0.140 | 0.4 | 2.0 | 0.3 | 0 | 0 | 0 |
| *20 | 0.999 | 0.950 | 0.050 | 0.860 | 0.140 | 0.4 | 3.0 | 0.3 | 0 | 0 | 0 |
| *21 | 1.007 | 0.870 | 0.130 | 0.800 | 0.200 | 1.2 | 0.3 | 0 | 0 | 0 | 0 |
| 22 | 1.007 | 0.870 | 0.130 | 0.800 | 0.200 | 1.2 | 0.3 | 0.1 | 0 | 0 | 0 |
| 23 | 1.007 | 0.870 | 0.130 | 0.800 | 0.200 | 1.2 | 0.3 | 0.5 | 0 | 0 | 0 |
| 24 | 1.007 | 0.870 | 0.130 | 0.800 | 0.200 | 1.2 | 0.3 | 2.5 | 0 | 0 | 0 |
| *25 | 1.007 | 0.870 | 0.130 | 0.800 | 0.200 | 1.2 | 0.3 | 5.0 | 0 | 0 | 0 |
| *26 | 1.002 | 0.950 | 0.050 | 0.860 | 0.140 | 0 | 0 | 0 | 0 | 0 | 0 |
| *27 | 1.002 | 0.950 | 0.050 | 0.860 | 0.140 | 0.8 | 0 | 0 | 0 | 0 | 0 |
| *28 | 1.002 | 0.950 | 0.050 | 0.860 | 0.140 | 0 | 0.3 | 0 | 0 | 0 | 0 |
| *29 | 1.002 | 0.950 | 0.050 | 0.860 | 0.140 | 0 | 0 | 0.2 | 0 | 0 | 0 |
| 30 | 1.002 | 0.950 | 0.050 | 0.860 | 0.140 | 0.8 | 0.3 | 0.2 | 0 | 0 | 0 |
| 31 | 0.960 | 0.910 | 0.090 | 0.870 | 0.130 | 0.8 | 0.2 | 0.1 | 0 | 0 | 0 |
| 32 | 0.965 | 0.910 | 0.090 | 0.870 | 0.130 | 0.8 | 0.2 | 0.1 | 0 | 0 | 0 |
| 33 | 0.985 | 0.910 | 0.090 | 0.870 | 0.130 | 0.8 | 0.2 | 0.1 | 0 | 0 | 0 |
| 34 | 1.000 | 0.910 | 0.090 | 0.870 | 0.130 | 1.2 | 0.3 | 0.5 | 0 | 0 | 0 |
| 35 | 1.030 | 0.910 | 0.090 | 0.870 | 0.130 | 0.8 | 0.2 | 0.1 | 0 | 0 | 0 |
| 36 | 1.035 | 0.910 | 0.090 | 0.870 | 0.130 | 0.8 | 0.2 | 0.1 | 0 | 0 | 0 |

| | | | Initial Characteristics | | | |
|---|---|---|---|---|---|---|
| Sample # | Firing Temperature (° C.) | $\epsilon$max | Rate of Change in Capacitance (−50° C.)** (%) | Rate of Change in Capacitance (+50° C.)*** (%) | Insulation Resistance (MΩ) | AC Breakdown Voltage (kV/mm) |
| 1 | 1400 | 12500 | −57 | −56 | $8.6 \times 10^{11}$ | 5.1 |
| 2 | 1400 | 11600 | −55 | −54 | $7.1 \times 10^{11}$ | 5.2 |
| 3 | 1400 | 10600 | −54 | −53 | $6.4 \times 10^{11}$ | 5.3 |
| 4 | 1400 | 6200 | −44 | −45 | $7.8 \times 10^{11}$ | 5.1 |
| 5 | 1400 | 6700 | −48 | −47 | $4.1 \times 10^{11}$ | 5.2 |
| 6 | 1400 | 8600 | −49 | −50 | $5.5 \times 10^{11}$ | 5.4 |
| 7 | 1400 | 6400 | −43 | −48 | $3.9 \times 10^{11}$ | 5.1 |
| *8 | 1400 | | Insufficient Sintering | | | |
| *9 | 1400 | | Insufficient Sintering | | | |
| *10 | 1400 | | Insufficient Sintering | | | |
| *11 | 1400 | | Insufficient Sintering | | | |
| *12 | 1400 | 13900 | −62 | −67 | $2.0 \times 10^{11}$ | 5.0 |
| 13 | 1400 | 12100 | −57 | −58 | $3.4 \times 10^{11}$ | 5.1 |
| 14 | 1400 | 9600 | −54 | −53 | $5.2 \times 10^{11}$ | 5.2 |
| 15 | 1400 | 6300 | −48 | −45 | $7.9 \times 10^{10}$ | 5.1 |
| *16 | 1400 | 5800 | −42 | −44 | $8.1 \times 10^{9}$ | 5.1 |
| *17 | 1390 | 12800 | −61 | −63 | $5.7 \times 10^{11}$ | 5.0 |
| 18 | 1390 | 10500 | −55 | −56 | $6.1 \times 10^{11}$ | 5.0 |
| 19 | 1400 | 8100 | −51 | −50 | $3.4 \times 10^{11}$ | 5.1 |
| *20 | 1400 | 5900 | −43 | −44 | $5.5 \times 10^{11}$ | 5.1 |
| *21 | 1390 | 8400 | −51 | −51 | $1.4 \times 10^{11}$ | 4.6 |
| 22 | 1390 | 8200 | −47 | −49 | $3.1 \times 10^{11}$ | 5.1 |
| 23 | 1390 | 8100 | −48 | −50 | $5.9 \times 10^{11}$ | 5.4 |
| 24 | 1390 | 8200 | −49 | −51 | $6.3 \times 10^{10}$ | 5.5 |
| *25 | 1390 | 7800 | −49 | −48 | $5.4 \times 10^{8}$ | 5.2 |
| *26 | 1400 | 15100 | −76 | −79 | $2.1 \times 10^{11}$ | 45 |
| *27 | 1400 | 14300 | −68 | −65 | $2.7 \times 10^{11}$ | 4.6 |
| *28 | 1400 | 13600 | −65 | −64 | $3.6 \times 10^{11}$ | 47 |
| *29 | 1400 | 15300 | −77 | −76 | $3.8 \times 10^{11}$ | 51 |
| 30 | 1400 | 12900 | −59 | −57 | $4.9 \times 10^{11}$ | 5.1 |
| 31 | 1390 | 12300 | −62 | −63 | $2.2 \times 10^{9}$ | 5.0 |
| 32 | 1390 | 12200 | −59 | −59 | $2.2 \times 10^{11}$ | 5.1 |
| 33 | 1390 | 12100 | −58 | −57 | $3.4 \times 10^{11}$ | 5.0 |
| 34 | 1390 | 11900 | −56 | −57 | $4.7 \times 10^{11}$ | 5.2 |
| 35 | 1390 | 7000 | −51 | −49 | $6.8 \times 10^{11}$ | 5.1 |
| 36 | 1390 | 5700 | −46 | −45 | $7.1 \times 10^{9}$ | 5.0 |

*PBW means parts by weight
**Rate of Change in capacitance between the temperature exhibiting a maximum capacitance and 50° therefrom
***Rate of Change in capacitance between the temperature exhibiting a maximum capacitance and +50° therefrom

TABLE 2

| Sample # | Primary Component | | | | Accessory Component PBW* | | | | | |
|---|---|---|---|---|---|---|---|---|---|---|
| | Ba | Ca | Ti | Zr | | | | | | |
| | a/b | (1-x) | (x) | (1-y) | (y) | $Y_2O_3$ | MgO | $Al_2O_3$ | MnO | $SiO_2$) | $Nb_2O_5$ |

| Sample # | a/b | (1-x) | (x) | (1-y) | (y) | $Y_2O_3$ | MgO | $Al_2O_3$ | MnO | $SiO_2$ | $Nb_2O_5$ |
|---|---|---|---|---|---|---|---|---|---|---|---|
| 37 | 1.000 | 0.880 | 0.120 | 0.880 | 0.120 | 1.1 | 0.3 | 0.2 | 0 | 0 | 0 |
| 38 | 1.000 | 0.880 | 0.120 | 0.880 | 0.120 | 1.1 | 0.3 | 0.2 | 0.1 | 0 | 0 |
| 39 | 1.000 | 0.880 | 0.120 | 0.880 | 0.120 | 1.1 | 0.3 | 0.2 | 0.5 | 0 | 0 |
| 40 | 1.000 | 0.880 | 0.120 | 0.880 | 0.120 | 1.1 | 0.3 | 0.2 | 2.0 | 0 | 0 |
| 41 | 1.000 | 0.880 | 0.120 | 0.880 | 0.120 | 1.1 | 0.3 | 0.2 | 3.0 | 0 | 0 |
| 42 | 1.007 | 0.870 | 0.130 | 0.800 | 0.200 | 2.0 | 0.2 | 0.1 | 0 | 0 | 0 |
| 43 | 1.007 | 0.870 | 0.130 | 0.800 | 0.200 | 2.0 | 0.2 | 0.1 | 0 | 0.2 | 0 |
| 44 | 1.007 | 0.870 | 0.130 | 0.800 | 0.200 | 2.0 | 0.2 | 0.1 | 0 | 0.5 | 0 |
| 45 | 1.007 | 0.870 | 0.130 | 0.800 | 0.200 | 2.0 | 0.2 | 0.1 | 0 | 2.0 | 0 |
| 46 | 1.007 | 0.870 | 0.130 | 0.800 | 0.200 | 2.0 | 0.2 | 0.1 | 0 | 3.0 | 0 |
| 47 | 1.006 | 0.950 | 0.050 | 0.860 | 0.140 | 1.5 | 0.3 | 0.2 | 0 | 0 | 0 |
| 48 | 1.006 | 0.950 | 0.050 | 0.860 | 0.140 | 1.5 | 0.3 | 0.2 | 0 | 0 | 0.2 |
| 49 | 1.006 | 0.950 | 0.050 | 0.860 | 0.140 | 1.5 | 0.3 | 0.2 | 0 | 0 | 0.5 |
| 50 | 1.006 | 0.950 | 0.050 | 0.860 | 0.140 | 1.5 | 0.3 | 0.2 | 0 | 0 | 1.0 |
| 51 | 1.006 | 0.950 | 0.050 | 0.860 | 0.140 | 1.5 | 0.3 | 0.2 | 0 | 0 | 2.0 |
| 52 | 1.004 | 0.950 | 0.050 | 0.850 | 0.150 | 0.8 | 0.3 | 0.2 | 0 | 0.4 | 0.2 |
| 53 | 1.004 | 0.950 | 0.050 | 0.850 | 0.150 | 0.8 | 0.3 | 0.2 | 0.15 | 0 | 0.2 |
| 54 | 1.004 | 0.950 | 0.050 | 0.850 | 0.150 | 0.8 | 0.3 | 0.2 | 0.15 | 0.4 | 0 |
| 55 | 1.004 | 0.950 | 0.050 | 0.850 | 0.150 | 0.8 | 0.3 | 0.2 | 0.15 | 0.4 | 0.2 |

| Sample # | Firing Temperature (°C.) | Initial Characteristics | | | | |
|---|---|---|---|---|---|---|
| | | $\epsilon$max | Rate of Change in Capacitance (−50° C.)** (%) | Rate of Change in Capacitance (+50° C.)*** (%) | Insulation Resistance (MΩ) | AC Breakdown Voltage (kV/mm) |
| 37 | 1390 | 10400 | −55 | −57 | $6.4 \times 10^{11}$ | 5.2 |
| 38 | 1380 | 9900 | −53 | −53 | $4.6 \times 10^{11}$ | 5.1 |
| 39 | 1370 | 8200 | −47 | −48 | $1.3 \times 10^{11}$ | 5.2 |
| 40 | 1360 | 6500 | −43 | −42 | $5.4 \times 10^{10}$ | 5.0 |
| 41 | 1360 | 5300 | −40 | −41 | $7.2 \times 10^{9}$ | 5.0 |
| 42 | 1390 | 8300 | −51 | −52 | $5.1 \times 10^{11}$ | 5.1 |
| 43 | 1380 | 8100 | −49 | −50 | $4.4 \times 10^{11}$ | 5.1 |
| 44 | 1370 | 8300 | −51 | −49 | $6.7 \times 10^{11}$ | 5.4 |
| 45 | 1360 | 8200 | −50 | −48 | $1.4 \times 10^{11}$ | 5.2 |
| 46 | 1360 | 8000 | −49 | −47 | $9.1 \times 10^{9}$ | 5.0 |
| 47 | 1380 | 11200 | −56 | −54 | $2.7 \times 10^{11}$ | 5.2 |
| 48 | 1380 | 11000 | −55 | −53 | $3.4 \times 10^{11}$ | 5.1 |
| 49 | 1380 | 10500 | −54 | −57 | $7.6 \times 10^{11}$ | 5.3 |
| 50 | 1380 | 10800 | −53 | −56 | $8.4 \times 10^{11}$ | 5.2 |
| 51 | 1380 | 10300 | −50 | −54 | $6.4 \times 10^{9}$ | 5.0 |
| 52 | 1380 | 11700 | −54 | −52 | $5.7 \times 10^{11}$ | 5.0 |
| 53 | 1380 | 11000 | −53 | −53 | $5.9 \times 10^{11}$ | 5.7 |
| 54 | 1370 | 10200 | −49 | −48 | $4.8 \times 10^{11}$ | 5.4 |
| 55 | 1370 | 10000 | −50 | −49 | $5.6 \times 10^{11}$ | 5.3 |

*PBW means parts by weight
**Rate of Change in capacitance between thetemperature exhibiting a maximum capacitance and −50° therefrom
***Rate of Change in capacitance between the temperature exhibiting a maximum capacitance and +50° therefrom Subsequently, the powdered mixtures thus obtained were calcined at 1,150° C. for 2 hours, thereby forming predetermined powdered compounds.

Five parts by weight of a vinyl acetate-based material functioning as a binder was added to 100 parts by weight of each powdered compound and was then wet-mixed by a ball mill.

Next, these mixtures were dried by evaporation and were granulated to produce powders, and these powdered starting materials were molded into disks 15 mm in diameter and 1.0 mm thick at a pressure of 2.5 ton/cm³.

These disks thus molded were fired in the air in an electric furnace at temperatures shown in Tables 1 and 2, thereby forming ceramic bodies. After an Ag paste was applied to two surfaces of each ceramic body, firing was performed at 800° C. in the air to form electrodes, and lead wires were then soldered thereto, thereby forming ceramic capacitor samples for evaluation.

Next, a voltage of 250 V was applied to each sample thus formed for 2 minutes for measuring insulation resistance.

In addition, under conditions of 1 kHz and 1 Vrms, the temperature characteristic of capacitance was measured, and rates of change (%) in capacitance between a temperature exhibiting a maximum capacitance, which was used a standard, and +50° C. and −50° C. therefrom were calculated. The reason this type of calculation was used is as follows. When temperature characteristics of capacitance at −25 and 85° C. areused, there may be a material which does not have a transition point in the vicinity of room temperature in some cases. Accordingly, when the rate of change in temperature characteristic of capacitance is calculated from the difference between temperature characteristic of capacitance at the transition point, which is used as the standard, and that at +50° C. or that at −50° C. therefrom, the characteristics of individual samples are easily compared to each other.

In addition, the maximum relative dielectric constant ($Å_{max}$) was calculated in accordance with equation 1 shown below:

$$Å_{max}=(C_{max} \times T)/\{Å_0 \times (D/2)^2 \times \pi\} \quad \text{Equation 1}$$

where $C_{max}$=maximum value of capacitance (F),
T=thickness of ceramic (m),
$Å_0$=dielectric constant in vacuum (F/m)=$8.854 \times 10^{-12}$,
D=diameter of ceramic (m), and
$\pi$=circular constant.

In addition, the breakdown voltage was obtained as an AC breakdown voltage per 1 mm thick by calculation.

The results are shown in Tables 1 and 2. In these Tables, samples marked with asterisks were out of the scope of the present invention.

Next, the reasons the ranges of the dielectric ceramic composition of the present invention are limited will be described.

When the molar amount of Ca (x) exceeds 0.25, the sintering properties are degraded so that sintering cannot be sufficiently performed even at a temperature of 1,400° C., as can be seen from the results of samples 10 and 11. A higher temperature is necessary in order to sinter the samples mentioned above, and that is not preferable since production cost is increased. Accordingly, x of the Ca is preferably in the range of more than zero to 0.25.

When the molar amount of Zr (y) exceeds 0.25, the sintering properties are degraded so that sintering cannot be sufficiently performed even at a temperature of 1,400° C., as can be seen from the results of samples 8 and 9. A higher temperature is necessary in order to sinter the samples mentioned above, which is not preferable since production cost is increased. Accordingly, y of the Zr is preferably in the range of more than zero to 0.25.

Addition of a Y component has an effect of decreasing the variation in temperature dependence of capacitance; however, as can be seen from the result of sample 12, when the $Y_2O_3$ amount is zero parts by weight, the rates of change in temperature dependence of capacitance between the transition point and +50° C. and −50° C. therefrom, which are obtained using a temperature characteristic of capacitance at the transition point as the standard, are decreased to below −60%, which is not preferable. In addition, as can be seen from the result of sample 16, when the $Y_2O_3$ amount is more than about 5 parts by weight, the $Å_{max}$ is considerably decreased to less than 6,000, and that is not preferable. Accordingly, the $Y_2O_3$ amount is preferably in the range of more than zero to about 5 parts by weight with respect to 100 parts by weight of the primary component.

Addition of a Mg component has an effect of decreasing the variation in temperature dependence of capacitance; however, as can be seen from the result of sample 17, when the MgO amount is zero parts by weight, the rates of change in temperature dependence of capacitance between the transition point and +50° C. and −50° C. therefrom, which are obtained using a temperature characteristic of capacitance at the transition point, are decreased to below −60%, and that is not preferable. In addition, as can be seen from the result of sample 20, when the MgO amount is more than about 2 parts by weight, the $Å_{max}$ is considerably decreased to less than 6,000, which is not preferable. Accordingly, the MgO amount is preferably in the range of more than zero to about 2 parts by weight with respect to 100 parts by weight of the primary component.

Addition of an Al component has an effect of increasing the AC breakdown voltage; however, as can be seen from the result of sample 21, when the $Al_2O_3$ amount is zero parts by weight, the AC breakdown voltage is decreased to less than 5.0 kV/mm, which is not preferable. In addition, as can be seen from the result of sample 25, when the $Al_2O_3$ amount is more than 2.5 parts by weight, the insulation resistance is decreased to less than $1.0 \times 10^{10}$, and that is not preferable. Accordingly, the $Al_2O_3$ amount is preferably in the range of more than zero to about 2.5 parts by weight with respect to 100 parts by weight of the primary component.

The addition components, $Y_2O_3$, MgO, and $Al_2O_3$, are necessary. When the conditions described above cannot be satisfied, as can be seen from the results of samples 26 to 29, it is not preferable since the rates of change in temperature dependence of capacitance between the transition point and +50° C. and −50° C. therefrom, which are obtained using a temperature characteristic of capacitance at the transition point, are decreased to below −60% or the AC breakdown voltage is decreased to less than 5.0 kV/mm.

The result of sample 31 shows that when a/b is less than 0.965, it is not preferable since the insulation resistance is decreased to less than $1.0 \times 10^{10}$. In addition, as can be seen from the result of sample 36, when a/b is more than 1.03, it is not preferable since the insulation resistance is decreased to less than $1.0 \times 10^{10}$. Accordingly, a/b is preferably in the range of 0.965 to 1.03.

Addition of a Mn component has the effects of decreasing the sintering temperature and improving the temperature characteristic of capacitance; however, as can be seen from the result of sample 41, when the Mn component in the form of MnO is added in an amount of more than about 2 parts by weight, it is not preferable since the insulation resistance is decreased to less than $1.0 \times 10^{10}$. Accordingly, the MnO amount is preferably about 2 parts by weight or less with respect to 100 parts by weight of the primary component.

Addition of a Si component has an effect of decreasing the sintering temperature; however, as can be seen from the result of sample 46, when the Si component in the form of $SiO_2$ is added in an amount of more than abut 2 parts by weight, it is not preferable since the insulation resistance is decreased to less than $1.0 \times 10^{10}$. Accordingly, the $SiO_2$ amount with respect to 100 parts by weight of the primary component is preferably about 2 parts by weight or less.

Addition of a Nb component has an effect of increasing the insulation resistance; however, as can be seen from the result of sample 51, when the Nb component in the form of $Nb_2O_5$ is added in an amount of more than about 1 part by weight, it is not preferable since the insulation resistance is decreased to less than $1.0 \times 10^{10}$. Accordingly, the $Nb_2O_5$ amount is preferably about 1 part by weight or less with respect to 100 parts by weight of the primary component.

In this example, as the starting materials, barium carbonate ($BaCO_3$), calcium carbonate ($CaCO_3$), titanium oxide ($TiO_2$), zirconium oxide ($ZrO_2$), yttrium oxide ($Y_2O_3$), magnesium oxide (MgO), aluminum oxide ($Al_2O_3$), manganese oxide (MnO), silicon oxide ($SiO_2$) and niobium oxide ($Nb_2O_5$) were mixed together in accordance with predetermined compositions and were then calcined. However, when yttrium oxide ($Y_2O_3$), magnesium oxide (MgO), aluminum oxide ($Al_2O_3$), manganese oxide (MnO), silicon oxide ($SiO_2$) and niobium oxide ($Nb_2O_5$) are added to a mixture which is formed beforehand by mixing barium carbonate ($BaCO_3$), calcium carbonate ($CaCO_3$), titanium oxide ($TiO_2$) and zirconium oxide ($ZrO_2$) together followed by calcination, the same advantages as those in this example can be obtained.

In addition, the starting materials in this example were barium carbonate ($BaCO_3$), calcium carbonate ($CaCO_3$), titanium oxide ($TiO_2$), zirconium oxide ($ZrO_2$), yttrium oxide ($Y_2O_3$), magnesium oxide (MgO), aluminum oxide ($Al_2O_3$), manganese oxide (MnO), silicon oxide ($SiO_2$) and niobium oxide ($Nb_2O_5$); however, the present invention is not limited to compositions formed of these starting material. For example, carbonates, oxalates, hydroxides, alkoxides and the like may also be used. In addition, when compounds such as $BaTiO_3$, $BaZrO_3$, $CaTiO_3$ and $CaZrO_3$ are used as the starting material, the same advantages as described above can be obtained.

Furthermore, a ceramic capacitor provided with the electrodes at the two surfaces thereof was formed in this example; however, the present invention is not limited thereto. For example, when the present invention is applied to a multilayer capacitor formed of dielectric ceramic layers laminated to each other, internal electrodes provided between the dielectric ceramic layers and external electrodes electrically connected to the internal electrodes, the same advantages as described above can be obtained.

According to the present invention, a dielectric ceramic composition can be obtained which has a high maximum relative dielectric constant of 6,000 or more, a flat temperature characteristic of capacitance having rates of change in temperature dependence of capacitance of −60% or above between a transition point and +50° C. and −50° C. therefrom, obtained using a temperature characteristic of capacitance at the transition point used as the standard, and a high AC breakdown voltage of 5.0 kV/mm or more.

In addition, when a dielectric ceramic is formed using the dielectric ceramic composition of the present invention and electrodes are provided on two surfaces of the dielectric ceramic to form a capacitor, a ceramic capacitor having superior characteristics of the dielectric ceramic composition described above can be obtained.

What is claimed is:

1. A dielectric ceramic composition comprising:
   a polycrystalline solid solution comprising barium titanate as a primary component and which is represented by the formula $(Ba_{1-x}Ca_x)_a(Ti_{1-y}Zr_y)_bO_3$ in which $0<x\leq0.25$ and $0<y\leq0.25$ and $960\leq a/b \leq 1.035$, and with respect to 100 parts by weight of the primary component:
   a Y component in the form of $Y_2O_3$ in an amount in the range of more than zero to about 5 parts by weight;
   a Mg component in the form of MgO in an amount in the range of more than zero to about 2 parts by weight, and
   an Al component in the form of $Al_2O_3$ in an amount in the range of more than zero to about 2.5 parts by weight.

2. A dielectric ceramic composition according to claim 1, further comprising a Mn component as an accessory component in the form of MnO in an amount of about 2 parts by weight or less with respect to 100 parts by weight of the primary component.

3. A dielectric ceramic composition according to claim 2, further comprising a Si component as an accessory component in the form of $SiO_2$ in an amount of about 2 parts by weight or less with respect to 100 parts by weight of the primary component.

4. A dielectric ceramic composition according to claim 3, further comprising a Nb component as an accessory component in the form of $Nb_2O_5$ in an amount of about 1 parts by weight or less with respect to 100 parts by weight of the primary component.

5. A capacitor comprising a dielectric ceramic having a plurality of surfaces and a dielectric ceramic composition according to claim 4 and electrodes provided on two surfaces of the dielectric ceramic.

6. A capacitor comprising a dielectric ceramic having a plurality of surfaces and a dielectric ceramic composition according to claim 3 and electrodes provided on two surfaces of the dielectric ceramic.

7. A capacitor comprising a dielectric ceramic having a plurality of surfaces and a dielectric ceramic composition according to claim 2 and electrodes provided on two surfaces of the dielectric ceramic.

8. A dielectric ceramic composition according to claim 1, further comprising a Si component as an accessory component in the form of $SiO_2$ in an amount of about 2 parts by weight or less with respect to 100 parts by weight of the primary component.

9. A dielectric ceramic composition according to claim 8, further comprising a Nb component as an accessory component in the form of $Nb_2O_5$ in an amount of about 1 parts by weight or less with respect to 100 parts by weight of the primary component.

10. A capacitor comprising a dielectric ceramic having a plurality of surfaces and a dielectric ceramic composition according to claim 8 and electrodes provided on two surfaces of the dielectric ceramic.

11. A dielectric ceramic composition according to claim 1, further comprising a Nb component as an accessory component in the form of $Nb_2O_5$ in an amount of about 1 parts by weight or less with respect to 100 parts by weight of the primary component.

12. A capacitor comprising a dielectric ceramic having a plurality of surfaces and a dielectric ceramic composition according to claim 11 and electrodes provided on two surfaces of the dielectric ceramic.

13. A capacitor comprising a dielectric ceramic having a plurality of surfaces and a dielectric ceramic composition according to claim 1 and electrodes provided on two surfaces of the dielectric ceramic.

14. A dielectric ceramic composition according to claim 1, wherein $0.960 \leq a/b \leq 1.03$.

15. A dielectric ceramic composition according to claim 14, further comprising an Mn component as an accessory component in the form of MnO in an amount of about 2 parts by weight or less with respect to 100 parts by weight of the primary component.

16. A dielectric ceramic composition according to claim 15, further comprising a Si component as an accessory component in the form of $SiO_2$ in an amount of about 2 parts by weight or less with respect to 100 parts by weight of the primary component.

17. A dielectric ceramic composition according to claim 16, further comprising an Nb component as an accessory component in the form of $Nb_2O_5$ in an amount of about 1 parts by weight or less with respect to 100 parts by weight of the primary component.

18. A capacitor comprising a dielectric ceramic having a plurality of surfaces and a dielectric ceramic composition according to claim 17 and electrodes provided on two surfaces of the dielectric ceramic.

19. A capacitor comprising a dielectric ceramic having a plurality of surfaces and a dielectric ceramic composition according to claim 14 and electrodes provided on two surfaces of the dielectric ceramic.

* * * * *